United States Patent
Wu et al.

(10) Patent No.: US 7,797,394 B2
(45) Date of Patent: Sep. 14, 2010

(54) SYSTEM AND METHOD FOR PROCESSING COMMANDS IN A STORAGE ENCLOSURE

(75) Inventors: Kai Yam Wu, Austin, TX (US); Farzad Khosrowpour, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 932 days.

(21) Appl. No.: 11/108,285

(22) Filed: Apr. 18, 2005

(65) Prior Publication Data
US 2006/0235937 A1    Oct. 19, 2006

(51) Int. Cl.
*G06F 15/173*    (2006.01)
(52) U.S. Cl. ..................................... 709/214
(58) Field of Classification Search ................. 709/214; 714/6, 11
See application file for complete search history.

(56) References Cited

U.S. PATENT DOCUMENTS

| | | | |
|---|---|---|---|
| 4,016,548 A * | 4/1977 | Law et al. ................... 370/476 |
| 4,067,059 A * | 1/1978 | Derchak ....................... 710/28 |
| 4,183,084 A * | 1/1980 | Lawson ........................ 710/36 |
| 4,215,400 A * | 7/1980 | Denko ........................... 711/4 |
| 4,228,496 A * | 10/1980 | Katzman et al. ............ 710/100 |
| 4,281,380 A * | 7/1981 | DeMesa et al. ............. 710/119 |
| 4,970,640 A * | 11/1990 | Beardsley et al. ........... 710/104 |
| 5,084,816 A * | 1/1992 | Boese et al. ..................... 714/4 |
| 5,088,021 A * | 2/1992 | McLaughlin et al. .......... 700/82 |
| 5,142,470 A * | 8/1992 | Bristow et al. ................. 700/79 |
| 5,317,752 A * | 5/1994 | Jewett et al. .................. 714/14 |
| 5,497,483 A * | 3/1996 | Beardsley et al. .............. 714/1 |
| 5,640,530 A * | 6/1997 | Beardsley et al. ............ 711/113 |
| 5,768,623 A * | 6/1998 | Judd et al. ..................... 710/37 |
| 5,787,473 A * | 7/1998 | Vishlitzky et al. ............ 711/134 |
| 6,085,333 A * | 7/2000 | DeKoning et al. .............. 714/7 |
| 6,223,301 B1 * | 4/2001 | Santeler et al. .................. 714/6 |
| 6,341,356 B1 * | 1/2002 | Johnson et al. ................. 714/4 |
| 6,378,084 B1 | 4/2002 | Strunk et al. |
| 6,408,343 B1 | 6/2002 | Erickson et al. |
| 6,598,106 B1 | 7/2003 | Grieshaber et al. |
| 6,895,480 B2 * | 5/2005 | Heil ........................... 711/153 |
| 6,910,098 B2 * | 6/2005 | LeCrone et al. ............. 711/112 |
| 6,928,583 B2 * | 8/2005 | Griffin et al. ................... 714/11 |
| 7,120,738 B2 * | 10/2006 | Ninomiya et al. ........... 711/113 |
| 7,190,575 B1 * | 3/2007 | Baik et al. ................... 361/685 |
| 7,251,701 B2 * | 7/2007 | Chikusa et al. ............... 710/74 |
| 7,269,674 B2 * | 9/2007 | Chikusa et al. ............... 710/74 |
| 7,377,800 B2 * | 5/2008 | Gasser ........................ 439/374 |
| 7,434,107 B2 * | 10/2008 | Marks ........................... 714/43 |
| 7,474,926 B1 * | 1/2009 | Carr et al. ..................... 700/19 |
| 7,496,700 B1 * | 2/2009 | Chong et al. ................... 710/52 |
| 2006/0174085 A1 | 8/2006 | Wu et al. |

* cited by examiner

*Primary Examiner*—David Y Eng
(74) *Attorney, Agent, or Firm*—Baker Botts L.L.P.

(57) ABSTRACT

A system and method for receiving and responding to issued commands in a storage enclosure is disclosed in which each storage enclosure processor of the storage enclosure is coupled to each expander of the storage enclosure. Each storage enclosure processor receives each interrupt and command issued by another expander of the storage enclosure. In the event of a failure of one of the storage enclosure processors, any interrupts or commands issued by the expander associated with the failed storage enclosure processor will be handled by the operational storage enclosure processor. In this configuration, the storage enclosure processor can also arbitrate or determine the storage enclosure processor that will handle each interrupt and any associated command.

20 Claims, 3 Drawing Sheets

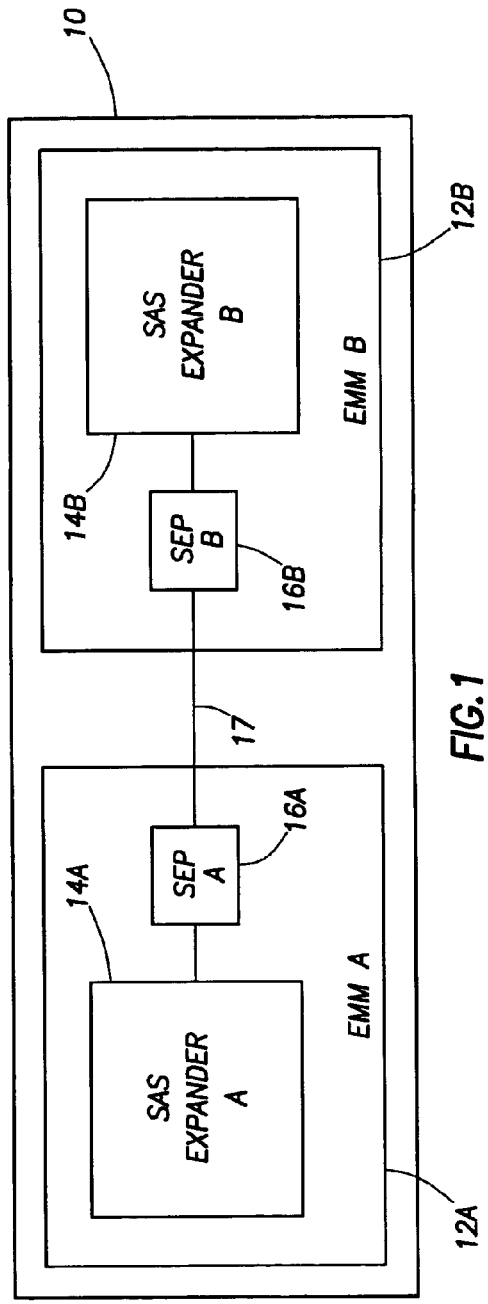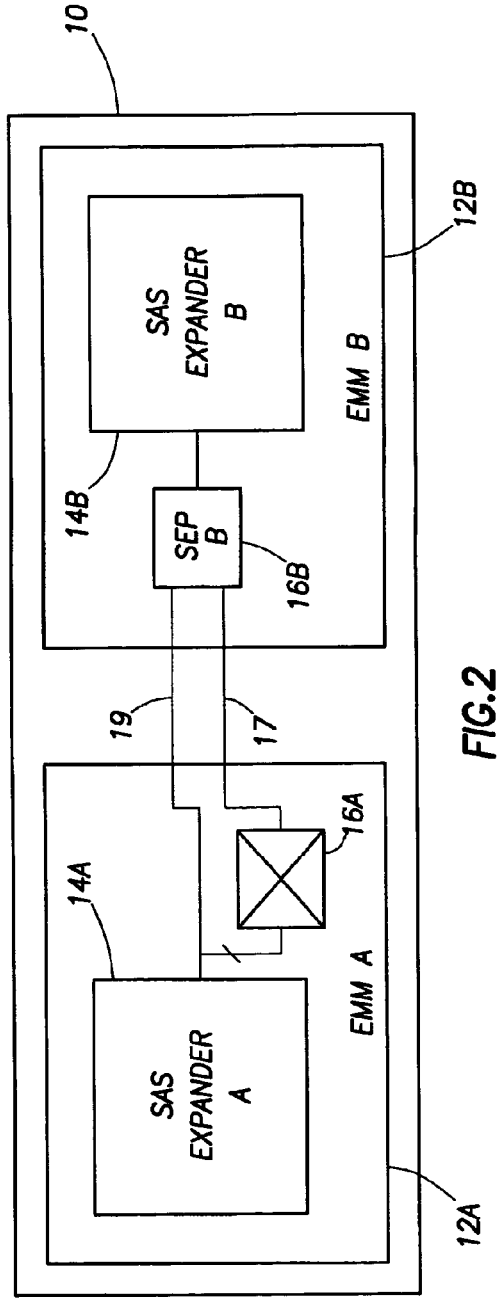

SYSTEM AND METHOD FOR PROCESSING COMMANDS IN A STORAGE ENCLOSURE

TECHNICAL FIELD

The present disclosure relates generally to the field of networks, and, more particularly, to a system and method for processing commands in a storage enclosure.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary with regard to the kind of information that is handled, how the information is handled, how much information is processed, stored, or communicated, and how quickly and efficiently the information may be processed, stored, or communicated. The variations in information handling systems allow for information handling systems to be general or configured for a specific user or specific use, including such uses as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computers, including servers and workstations, are often grouped in clusters to perform specific tasks. A server cluster is a group of independent servers that is managed as a single system. Compared with groupings of unmanaged servers, a server cluster is characterized by higher availability, manageability, and scalability. A server cluster typically involves the configuration of a group of servers such that the servers appear in the network as a single machine or unit. At a minimum, a server cluster includes two servers, which are sometimes referred to as nodes, which are connected to one another by a network or other communication links. A storage network may be coupled to the server cluster. A storage network will typically include one or more storage devices that may or may not be shared by the servers of the server cluster. A storage network may include one or more storage enclosures, which may house a plurality of disk-based hard drives. A storage controller may be included within the servers of the server cluster of a storage controller may be external to the servers and included within the enclosures of the storage network.

The servers of the cluster server may communicate with the storage network according to the Serial Attached SCSI (SAS) communications protocol. Serial Attached SCSI is a storage network interface that is characterized by a serial, point-to-point architecture. In addition, the storage of a cluster network may include some element of fault tolerant storage. One example of fault tolerant storage is RAID (Redundant Array of Independent Disks) storage. RAID storage involves the organization of multiple disks into an array of disks to obtain performance, capacity, and reliability advantages.

Each server of a cluster network is sometimes identified as a node of the network. The nodes of a cluster network are directly coupled to one another to support the operational monitoring of each nodes, the sharing or failing-over of storage resources among the nodes in the storage network, and the configuration of the cluster network. In the event of a failure of the direct communication link, the operation of the cluster network could be compromised, as the nodes can no longer directly communicate with one another to monitor and manage the operation of the cluster network.

SUMMARY

In accordance with the present disclosure, a system and method for receiving and responding to commands in a storage enclosure is disclosed in which each storage enclosure processor of the storage enclosure is coupled to each expander of the storage enclosure. In this configuration, each storage enclosure processor receives each interrupt and is operable to process a command transmitted by either of the expanders of the storage enclosure. In the event of a failure of one of the storage enclosure processors, any interrupts and commands issued by the expander associated with the failed storage enclosure processor will be handled by the operational storage enclosure processor. In this configuration, the storage enclosure processor can also arbitrate or determine the storage enclosure processor that will handle each interrupt and command, and this determination can be made on a load balancing basis.

The system and method disclosed herein is advantageous because it provides a methodology that provides for the processing of interrupts and commands despite the failure of one of the storage enclosure processor of the cluster network. Because both storage enclosure processors are coupled through interrupt lines and data and command lines to each source of interrupt and commands in the storage enclosure, the failure of one of the storage enclosure processors does not prevent the other storage enclosure processor from receiving and responding to the interrupt or command. In addition, the disclosed system and method is advantageous because each storage enclosure processor monitors the status of the opposite storage enclosure processor through a direct communications link between the two processors.

Another technical advantage of the system and method disclosed herein is the ability of the storage enclosure processors to determine which of the storage enclosure processor will handle any interrupt and command received by each of the storage enclosure processors. Because each interrupt or command will be received by each storage enclosure processors, the storage enclosure processors may communicate with on another to determine which of the storage enclosure processors will handle the interrupt. The selection of the storage enclosure processor can be based on the operational status of the storage enclosure processor or on a load balancing basis, following a consideration of the respective workloads of the storage enclosure processors. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1 is a logical diagram of a storage enclosure;

FIG. 2 is a logical diagram of a storage enclosure depicting a failed storage enclosure processor.

DETAILED DESCRIPTION

Figure 3:
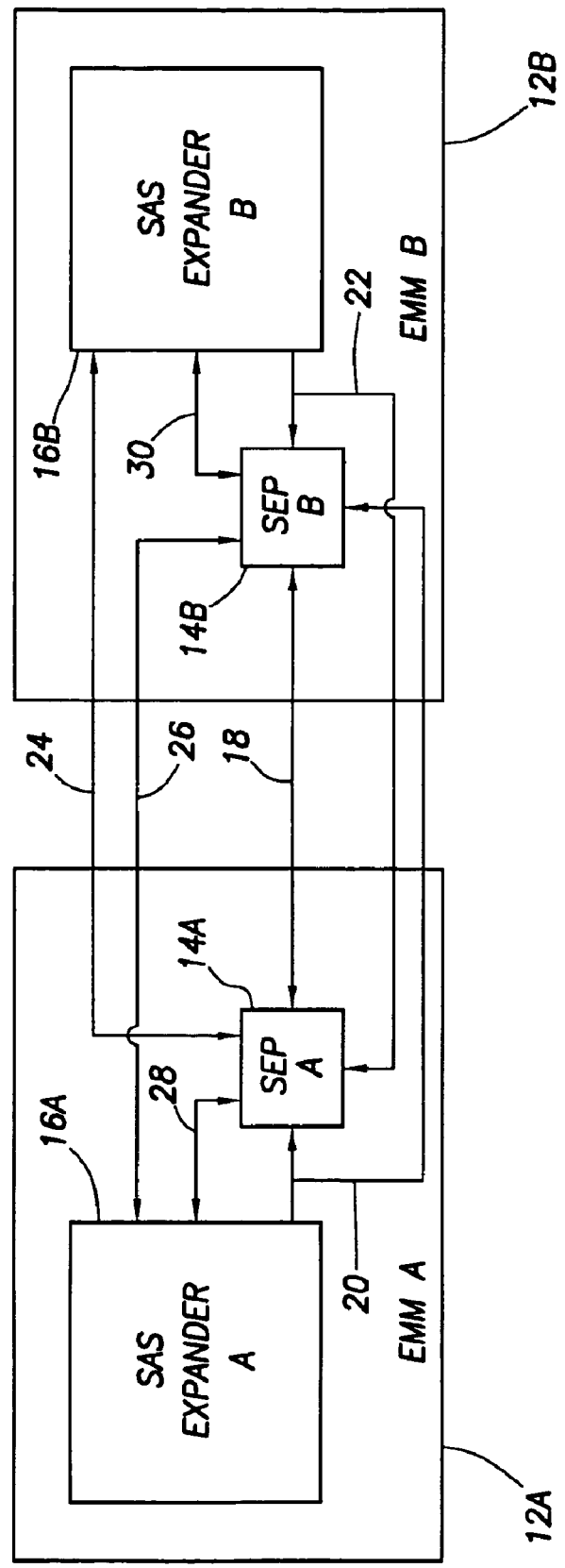
FIG. 3 is a diagram of the communication lines of a storage enclosure processor.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a person computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Shown in FIG. 1 is logical diagram of a storage enclosure 10. Storage enclosure 10 includes first and second enclosure management modules (EMM), which are identified in FIG. 1 as enclosure management module A at 12a and enclosure management module B at 12B. Enclosure management module A includes an SAS expander 14A coupled to a storage enclosure processor A, which is identified at 16A. Similarly, enclosure management module B includes an SAS expander 14B coupled to a storage enclosure processor B at 16B. Each SAS expander typically includes one or more output ports for coupling the storage enclosure to other storage enclosures or server nodes. Storage enclosure processor B is coupled to storage enclosure processor A through communications link 17. In the example of FIG. 1, all commands issued from SAS expander A are directed to and processed by storage enclosure processor A, and all commands issued from SAS expander B are directed to and processed by storage enclosure processor B. Although a storage controller is not depicted in FIG. 1, it should be recognized that a storage controller could be included within the storage enclosure of FIG. 1. Alternatively, a storage controller could be included within a host of server that is coupled to the storage enclosure.

Shown in FIG. 2 is a second example of a logical diagram of a storage enclosure. The diagram of FIG. 2 is similar to that of FIG. 1 with the exception that the storage enclosure processor of storage enclosure A has failed. Because storage enclosure processor A has failed, it is not able to accept commands from SAS expander A, and commands from SAS expander A are routed to storage enclosure processor B for handling. One of the functions of expander 14 is to route commands received at the storage enclosure. Although described herein as an expander, block 14 could be any port operable to receive a command at a storage enclosure and route the command to a processor within the storage enclosure.

Shown in FIG. 3 is a logical diagram of a set of communications links for handling communications to and between the storage enclosure processors of each of the enclosure management modules of the storage enclosure. A command from an SAS expander to a storage enclosure processor is typically preceded by an interrupt. A first interrupt line 20 is coupled from SAS expander A to each of storage enclosure processor A and storage enclosure processor B. A second interrupt line 22 is coupled from SAS expander B top each of storage enclosure processor A and storage enclosure processor B. According to this architecture, an interrupt generated by either of the SAS expander is received at both of the storage enclosure processors of the storage enclosure. Each storage enclosure processor is coupled through a data and command line to the associated SAS expander of the enclosure management module. In the example of FIG. 3, storage enclosure processor A is coupled to SAS expander A through data and command line 28, and storage enclosure processor B is coupled to SAS expander B through data and command line 30. In addition, each storage enclosure processor is coupled via a data and command line to the SAS expander of the opposite enclosure management module. In the example of FIG. 3, storage enclosure processor A is coupled through data and command line 24 to SAS expander B, and storage enclosure processor B is coupled through data and command line 26 to SAS expander A. According to this architecture, each interrupt and command is received at the storage enclosure processor of the opposite enclosure management module. Storage enclosure processor A is coupled to storage enclosure processor B by a status line 18. Each storage enclosure processor is able to monitor the operational status of the opposite storage enclosure processor through status line 18.

In operation, each storage enclosure processor receives each interrupt and command issued by each SAS expander. In one embodiment of the invention, each storage enclosure processor masks those interrupts issued by the SAS expander of the opposite enclosure management module and only responds to those interrupts issued by the associated enclosure management module. In the example of FIG. 3, and following this masking protocol, storage enclosure processor A masks and does not respond to interrupts received from SAS expander B. Storage enclosure processor A responds to interrupts issued by SAS expander A. Likewise, storage enclosure processor B masks and does respond to interrupts received from SAS expander A. Storage enclosure processor B responds to interrupts issued by SAS expander B. The masking function described herein may comprise any function or methodology by which a storage enclosure processor does not respond to an interrupt issued by the SAS expander associated with the other storage enclosure processor. When one of the storage enclosure processors determines that the opposite storage enclosure processor, the operational storage enclosure processor unmasks all interrupts so that the operational storage enclosure processor responds to all interrupts issued by either of the SAS expanders. The step of unmasking at a storage enclosure processor may comprise any technique in which the storage enclosure responds to previously received, but ignored, interrupts.

Figure 4:
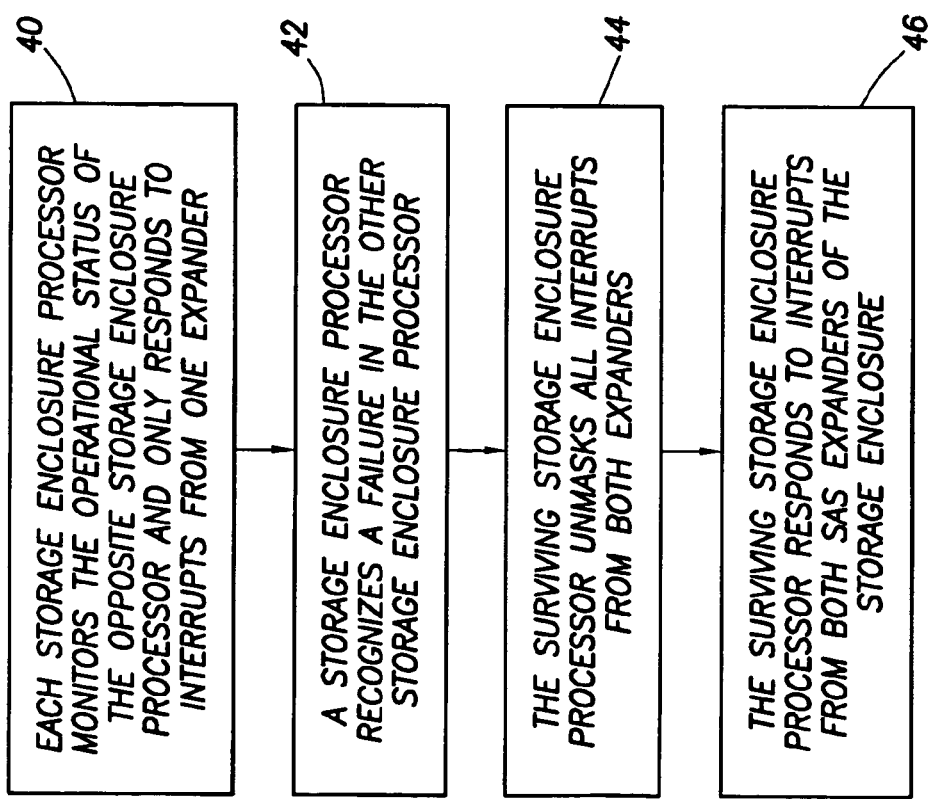
FIG. 4 is a flow diagram of a series of method steps for managing the issuance of interrupts by the storage enclosure processors of the storage enclosure.

Shown in FIG. 4 is a series of method steps for managing the issuance of interrupts by the storage enclosure processors of the storage enclosure. At step 40, each storage enclosure processor monitors the operational status of the opposite storage enclosure processor through status line 18. At some point, as indicated by step 42, one of the storage enclosure processors determines that the other storage enclosure processor is not operational. Upon recognizing that the opposite storage enclosure processor is not operational, the operational storage enclosure processor at step 44 removes all interrupt masks so that the operational storage enclosure processor responds to interrupts and commands issued by either of the SAS expanders of the storage enclosure.

Figure 5:
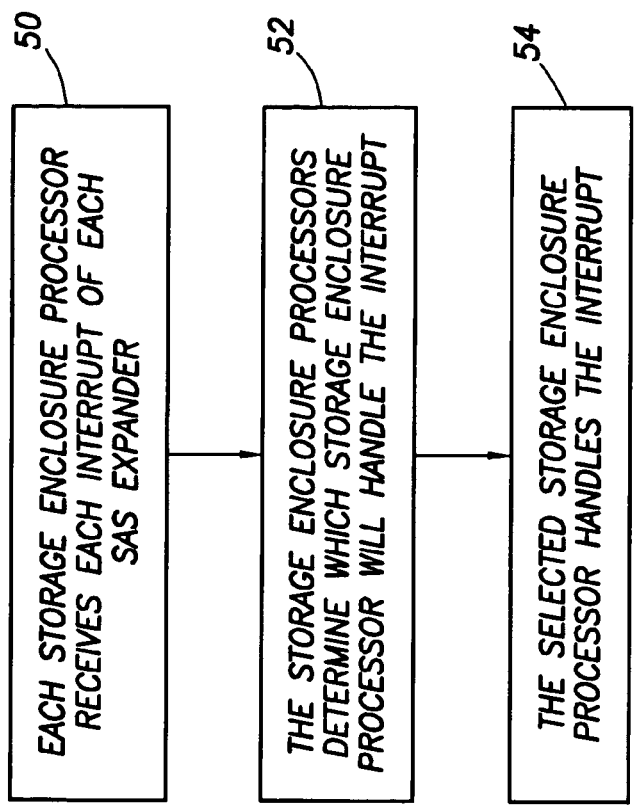
FIG. 5 is a flow diagram of a series of method steps for managing the selection of a storage enclosure processor for the handling of an interrupt.

In addition to receiving each interrupt request when the opposite storage enclosure processor is not operational, the storage enclosure processors could operate in a mode in which each storage enclosure processor receives each interrupt and command and the storage enclosure processors determine which of the two storage enclosure processors will be responsible for the handling of the interrupt and the command associated with the interrupt. This method of operation is shown in FIG. 5. In this mode of operation, at step 50, each storage enclosure processor receives each interrupt or command issued from each SAS expander. At step 52, the storage enclosure processors determine which of the two storage enclosure processors will handle the interrupt and any command associated with the interrupt. At step 54, the selected processor handles the interrupt and the any associated commands. In this manner, the storage enclosure processors can determine which storage enclosure processor will handle the interrupt by employing a load balancing approach that takes into account the workload and capacity of each of the two storage enclosure processors. The storage enclosure processors perform the arbitration function by communicating across status line 18. In this mode of operation, if one of the two storage enclosures processors fails, the other storage enclosure processor will recognize the failure and will handle each interrupt and command until the opposite storage enclosure processor returns to an operational status.

As a result of the architecture disclosed herein, the host views each storage enclosure processor as having a virtual dual port configuration. If a failure occurs in one of the storage enclosure processor, the host coupled to the storage enclosure processor will not be affected by the failure, as commands issued by the host are being processed in the storage enclosure according to the failover methods disclosed herein. Thus, despite the existence of a point-to-point connection between a host and one of the enclosure management modules of the storage enclosure, a virtual connection can be established in the event of failure of one of the storage enclosure processors of the storage enclosure. The architecture provides a dual port interface for the host in which the failure of one port, which may comprise the failure of the storage enclosure processor itself, does not disable communications between the host and the storage enclosure. Although the present disclosure has been described in detail, it should be understood that various changes, substitutions, and alterations can be made hereto without departing from the spirit and the scope of the invention as defined by the appended claims.

What is claimed is:

1. A storage enclosure, comprising:
a first expander port within a storage enclosure;
a second expander port within the storage enclosure;
a first storage enclosure processor within the storage enclosure;
a second storage enclosure processor within the storage enclosure;
wherein a first command line is coupled between the first expander port and each of the first storage enclosure processor and the second storage enclosure processor, and wherein the first storage enclosure processor is operable to monitor operational status of the second storage enclosure processor and receive commands routed from each of the first expander port and the second expander port;
wherein a second command line is coupled between the second expander port and each of the first storage enclosure processor and the second storage enclosure processor, and wherein the second storage enclosure processor is operable to monitor operational status of the first storage enclosure processor and receive commands routed from each of the first expander port and the second expander port; and
wherein an interrupt and a command initiated by either the first expander port or the second expander port is received by each of the first storage enclosure processor and the second storage enclosure processor, wherein each storage enclosure processor masks the interrupt if the interrupt was initiated by the expander port associated with the other storage enclosure processor, and wherein the first storage enclosure processor or the second storage enclosure processor are operable to process the command; and
if it is determined that one of the first storage enclosure processor and the second storage enclosure processor is not operational, the operational storage enclosure processor unmasks the interrupt received from the expander port associated with the non-operational enclosure processor.

2. The storage enclosure of claim 1, wherein the first storage enclosure processor is coupled to the second storage enclosure processor by a communications link.

3. The storage enclosure of claim 2, wherein the first storage enclosure processor is coupled to the second storage enclosure processor and the second storage enclosure processor determine which of the storage enclosure processors will handle any command issued by either the first expander port or the second expander port.

4. The storage enclosure of claim 3, wherein the assignment of a command to the first storage enclosure processor or the second storage enclosure processor is accomplished according to a load balancing scheme.

5. The storage enclosure of claim 2, wherein the first storage enclosure processor monitors operational status of the second storage enclosure through the communications link, and wherein the second storage enclosure processor monitors operational status of the first storage enclosure through the communications link.

6. The storage enclosure of claim 5,
wherein a first interrupt line is coupled between the first expander port and each of the first storage enclosure processor and the second storage enclosure processor; and
wherein a second interrupt line is coupled between the second expander port and each of the first storage enclosure processor and the second storage enclosure processor.

7. The storage enclosure of claim 6, wherein each of the first storage enclosure processor and the second storage enclosure processor is operable to handle all interrupts issued by the first expander port and the second expander port in the event of a failure in the opposite storage enclosure processor.

8. The storage enclosure of claim 1,
wherein the first storage enclosure processor is coupled to the second expander port by a command line; and
wherein the second storage enclosure processor is coupled to the first expander port by a command line.

9. The storage enclosure of claim 1, wherein the first expander port and the second expander port each comprise an SAS expander.

10. A method for managing the handling of interrupts in a storage enclosure, wherein the storage enclosure includes first and second storage enclosure processors, each of which is coupled to a first expander module associated with the first storage enclosure processor and a second expander module associated with the second storage enclosure processor, comprising:

monitoring the operational status of each of the first and second storage enclosure processors;

receiving an interrupt and a command issued by the first expander module or the second expander module at each of the first storage enclosure processor and the second storage enclosure processor;

masking off at each of the first storage enclosure processor and the second storage enclosure processor interrupts issued by the expander module associated with the other storage enclosure processor; and if it is determined that one of the first storage enclosure processor or the second storage enclosure processor is not operational, unmasking at the operational storage enclosure processor interrupts issued by the non-operational storage enclosure processor or by the expander module associated with the non-operational enclosure processor.

11. The method for managing the handling interrupts in a storage enclosure of claim 10, wherein the step of monitoring the operational status of each of the first and second storage enclosure processors is performed by each of the first storage enclosure processor and the second storage enclosure processor.

12. The method for managing the handling interrupts in a storage enclosure of claim 11, wherein the step of monitoring the operational status of each of the first and second storage enclosure processors comprises the step of monitoring the operation of each of the first and second storage enclosure processors through a communications link coupled between the first storage enclosure processor and the second storage enclosure processor.

13. The method for managing the handling interrupts in a storage enclosure of claim 11, wherein the determination that one of the first storage enclosure processor or the second storage enclosure processor is not operational is made by evaluation signals passed through the communications link coupled between the first storage enclosure processor and the second storage enclosure processor.

14. The method for managing the handling interrupts in a storage enclosure of claim 10,
wherein the first storage enclosure processor is coupled to the second expander module by a command line; and
wherein the second storage enclosure processor is coupled to the first expander module by a command line.

15. The method for managing the handling interrupts in a storage enclosure of claim 10, wherein the first expander module and the second expander module each comprise an SAS expander.

16. A storage enclosure, comprising:
a first expander port within a storage enclosure;
a second expander port within the storage enclosure;
a first storage enclosure processor within the storage enclosure; and
a second storage enclosure processor within the storage enclosure;
wherein a first command line is coupled between the first expander port and each of the first storage enclosure processor and the second storage enclosure processor, and wherein the first storage enclosure processor is operable to monitor operational status of the second storage enclosure processor and receive commands routed from each of the first expander port and the second expander port;
wherein a second command line is coupled between the second expander port and each of the first storage enclosure processor and the second storage enclosure processor, and wherein the second storage enclosure processor is operable to monitor operational status of the first storage enclosure processor and receive commands routed from each of the first expander port and the second expander port;
wherein an interrupt and a command transmitted by either the first expander port or the second expander port is received by each of the first storage enclosure processor and the second storage enclosure processor, wherein each storage enclosure processor masks the interrupt if the interrupt was initiated by the expander port associated with the other storage enclosure processor, and
if it is determined that one of the first storage enclosure processor and the second storage enclosure processor is not operational, the operational storage enclosure processor unmasks the interrupt issued by the non-operational storage enclosure processor or by the expander port associated with the non-operational enclosure processor.

17. The storage enclosure of claim 16, wherein the first storage enclosure processor is coupled to the second storage enclosure processor by a communications link.

18. The storage enclosure of claim 17, wherein the first storage enclosure processor and the second storage enclosure processor determine which of the storage enclosure processors will handle any command by either the first expander port or the second expander port.

19. The storage enclosure of claim 18, wherein the assignment of a command to the first storage enclosure processor or the second storage enclosure processor is accomplished according to a load balancing scheme.

20. The storage enclosure of claim 16, wherein each of the first storage enclosure processor and the second storage enclosure processor is operable to handle all commands issued by the first expander port and the second expander port in the event of a failure in the opposite storage enclosure processor.

* * * * *